United States Patent
Miyamoto et al.

(10) Patent No.: US 12,018,357 B2
(45) Date of Patent: Jun. 25, 2024

(54) NON-ORIENTED ELECTRICAL STEEL SHEET AND METHOD OF PRODUCING SAME

(71) Applicant: JFE STEEL CORPORATION, Tokyo (JP)

(72) Inventors: Yukino Miyamoto, Tokyo (JP); Yoshiaki Zaizen, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 57 days.

(21) Appl. No.: 17/754,146

(22) PCT Filed: Sep. 17, 2020

(86) PCT No.: PCT/JP2020/035362
§ 371 (c)(1),
(2) Date: Mar. 25, 2022

(87) PCT Pub. No.: WO2021/065555
PCT Pub. Date: Apr. 8, 2021

(65) Prior Publication Data
US 2022/0290287 A1 Sep. 15, 2022

(30) Foreign Application Priority Data
Oct. 3, 2019 (JP) .................... 2019-183100

(51) Int. Cl.
*C23C 10/08* (2006.01)
*C21D 6/00* (2006.01)
(Continued)

(52) U.S. Cl.
CPC .............. *C23C 10/08* (2013.01); *C21D 6/005* (2013.01); *C21D 6/008* (2013.01); *C21D 9/46* (2013.01);
(Continued)

(58) Field of Classification Search
None
See application file for complete search history.

(56) References Cited

U.S. PATENT DOCUMENTS 5,993,568 A 11/1999 Takada et al.
6,527,876 B2 3/2003 Namikawa et al.
(Continued)

FOREIGN PATENT DOCUMENTS

CA 3051823 A1 8/2018
CN 101122022 A 2/2008
(Continued)

OTHER PUBLICATIONS

Nov. 24, 2020, International Search Report issued in the International Patent Application No. PCT/JP2020/035362.
(Continued)

*Primary Examiner* — Kim S. Horger
(74) *Attorney, Agent, or Firm* — KENJA IP LAW PC

(57) ABSTRACT

Disclosed is a non-oriented electrical steel sheet having low iron loss in a frequency range of about 400 Hz. The non-oriented electrical steel sheet comprises an inner layer and surface layers, wherein the inner layer and surface layers have specific chemical compositions, each of the surface layers has an in-plane tensile stress of 5 MPa to 50 MPa, the non-oriented electrical steel sheet has a sheet thickness t of 0.01 mm to 0.35 mm, the surface layers have a total thickness $t_1$ with a ratio $t_1/t$ of the total thickness $t_1$ to the sheet thickness t being 0.10 to 0.70, the non-oriented electrical steel sheet has an average N content [N] in the total sheet thickness of 40 ppm or less, and an iron loss $W_{10/400}$ and the sheet thickness t satisfy the following formula (1):

$$W_{10/400} \leq 8+30t \quad (1).$$

15 Claims, 7 Drawing Sheets

(51) Int. Cl.
  *C21D 9/46* (2006.01)
  *C22C 38/00* (2006.01)
  *C22C 38/02* (2006.01)
  *C22C 38/04* (2006.01)
  *C22C 38/06* (2006.01)
  *C22C 38/60* (2006.01)
  *C23C 10/60* (2006.01)
  *H01F 1/147* (2006.01)

(52) U.S. Cl.
  CPC .......... *C22C 38/002* (2013.01); *C22C 38/008* (2013.01); *C22C 38/02* (2013.01); *C22C 38/04* (2013.01); *C22C 38/06* (2013.01); *C22C 38/60* (2013.01); *C23C 10/60* (2013.01); *H01F 1/14775* (2013.01); *C22C 2202/02* (2013.01)

(56) References Cited

U.S. PATENT DOCUMENTS

| | | | |
|---|---|---|---|
| 2002/0134466 A1 | 9/2002 | Namikawa et al. | |
| 2013/0146187 A1 | 6/2013 | Zaizen et al. | |
| 2015/0013850 A1* | 1/2015 | Imamura | C22C 38/08 148/309 |
| 2019/0112697 A1 | 4/2019 | Hiratani et al. | |

FOREIGN PATENT DOCUMENTS

| | | | | |
|---|---|---|---|---|
| CN | 102199721 A | | 9/2011 | |
| CN | 108884535 A | | 11/2018 | |
| EP | 3176279 A1 | | 6/2017 | |
| EP | 3351649 A1 | | 7/2018 | |
| JP | H059705 A | | 1/1993 | |
| JP | H05125496 A | | 5/1993 | |
| JP | H11199988 A | | 7/1999 | |
| JP | H11199988 A | * | 7/1999 | |
| JP | H11256289 A | | 9/1999 | |
| JP | H11256289 A | * | 9/1999 | |
| JP | H11293422 A | | 10/1999 | |
| JP | H11307352 A | | 11/1999 | |
| JP | H11307353 A | | 11/1999 | |
| JP | 2000045053 A | | 2/2000 | |
| JP | 2005120403 A | | 5/2005 | |
| JP | 2009263782 A | | 11/2009 | |
| JP | 2012046806 A | | 3/2012 | |
| JP | 2012251191 A | | 12/2012 | |
| JP | 2013159823 A | | 8/2013 | |
| WO | WO-2017170749 A1 | * | 10/2017 | ............... C21D 1/74 |

OTHER PUBLICATIONS

Dec. 28, 2022, Office Action issued by the Canadian Intellectual Property Office in the corresponding Canadian Patent Application No. 3,151,160.

Aug. 8, 2022, Office Action issued by the China National Intellectual Property Administration in the corresponding Chinese Patent Application No. 202080066999.3 with English language search report.

Mar. 15, 2022, Notification of Reasons for Refusal issued by the Japan Patent Office in the corresponding Japanese Patent Application No. 2021-507723 with English language concise statement of relevance.

Feb. 3, 2023, the Extended European Search Report issued by the European Patent Office in the corresponding European Patent Application No. 20871054.1.

Dec. 13, 2023, Office Action issued by the Korean Intellectual Property Office in the corresponding Korean Patent Application No. 10-2022-7008618 with English language concise statement of relevance.

* cited by examiner

NON-ORIENTED ELECTRICAL STEEL SHEET AND METHOD OF PRODUCING SAME

TECHNICAL FIELD

This disclosure relates to a non-oriented electrical steel sheet, and in particular to a non-oriented electrical steel sheet having low iron loss in a high-frequency region. This disclosure also relates to a method of producing the aforementioned non-oriented electrical steel sheet.

BACKGROUND

Motors used for electric vehicles and hybrid electric vehicles are driven in a high-frequency region from the viewpoint of reducing the size and achieving high efficiency. Therefore, for non-oriented electrical steel sheets used for core materials of such motors, low iron loss in the high-frequency region is required.

Therefore, to reduce the iron loss in the high-frequency region, various methods, such as addition of alloying elements such as Si and Al and reduction in sheet thickness, have been examined.

For example, JPH11-293422A (PTL 1) proposes a technique to subject a steel sheet to siliconizing annealing to control a Si concentration distribution in the thickness direction.

CITATION LIST

Patent Literature

PTL 1: JPH11-293422A

SUMMARY

Technical Problem

However, the conventional method as proposed in PTL 1 presented a certain improvement in iron loss in the high-frequency region, but such improvement was still not sufficient. Specifically, there was a problem that the iron loss could not be sufficiently reduced when a non-oriented electrical steel sheet obtained by the aforementioned conventional method was used as an iron core material of electric equipment driven at a frequency of about 400 Hz, where the influence of hysteresis loss is large.

This disclosure was made in consideration of the above situation and it could be helpful to provide a non-oriented electrical steel sheet with further reduced iron loss in a frequency range of about 400 Hz.

Solution to Problem

As a result of diligent study of a method of solving the above problem, we found that, in order to reduce iron loss in a frequency range of about 400 Hz, it is important to reduce a stress caused by the difference in lattice constant between surface layers and an inner layer of a steel sheet and to reduce an average content of N as inevitable impurities contained in steel. This disclosure is based on the aforementioned discoveries and primary features thereof are described below.

1. A non-oriented electrical steel sheet having an inner layer defined as a region where a Si content is less than an average Si content in a total sheet thickness, and surface layers defined as regions where a Si content is greater than or equal to the average Si content in the total sheet thickness, the surface layers being provided on both sides of the inner layer, the non-oriented electrical steel sheet comprising a chemical composition containing (consisting of): Si; and C in an amount of 0.020 mass % or less, Mn in an amount of 0.010 mass % to 2.0 mass %, and S in an amount of 0.0100 mass % or less as average contents in the total sheet thickness, with the balance being Fe and inevitable impurities, wherein each of the surface layers has an average Si content $[Si]_1$ of 2.5 mass % to 7.0 mass %, the inner layer has an average Si content $[Si]_0$ of 1.5 mass % to 5.0 mass %, each of the surface layers has an in-plane tensile stress of 5 MPa to 50 MPa, the non-oriented electrical steel sheet has a sheet thickness t of 0.01 mm to 0.35 mm, the surface layers have a total thickness $t_1$ with a ratio $t_1/t$ of the total thickness $t_1$ to the sheet thickness t being 0.10 to 0.70, the non-oriented electrical steel sheet has an average N content [N] in the total sheet thickness of 40 ppm or less, and the following formula (1) is satisfied between an iron loss $W_{10/400}$ (W/kg) at a maximum magnetic flux density of 1.0 T and a frequency of 400 Hz and the sheet thickness t (mm):

$$W_{10/400} \leq 8 + 30t \quad (1).$$

2. The non-oriented electrical steel sheet according to 1., wherein the chemical composition further contains at least one selected from the group consisting of Al in an amount of 0.10 mass % or less, P in an amount of 0.10 mass % or less, Sn in an amount of 0.10 mass % or less, and Sb in an amount of 0.10 mass % or less as average contents in the total sheet thickness.

3. The non-oriented electrical steel sheet according to 1. or 2., further comprising, a texture where a ratio {100}/{111} of an integration degree of {100} plane to an integration degree of {111} plane is 55% to 90% in a cross section with Φ2=45° of an orientation distribution function at a depth of ¼ of the sheet thickness from a surface of the non-oriented electrical steel sheet.

4. The non-oriented electrical steel sheet according to any one of 1. to 3., wherein the chemical composition further satisfies the following formula (2):

$$[Mn][S] \leq 0.0030 \quad (2);$$

where [Mn] and [S] are average contents in mass % of Mn and S in the total sheet thickness.

5. A method of producing the non-oriented electrical steel sheet according to any one of 1. to 4., the method comprising: subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less; subjecting the steel sheet after the siliconizing treatment to a diffusion treatment in an $N_2$ atmosphere at a temperature of 950° C. or more and 1300° C. or less; and cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

Advantageous Effect

According to the present disclosure, a non-oriented electrical steel sheet with further reduced iron loss in a frequency range of about 400 Hz can be obtained.

DETAILED DESCRIPTION

The following provides details of a method of carrying out this disclosure. The following description merely presents examples of preferred embodiments of this disclosure, and this disclosure is not limited to these embodiments.

[Non-Oriented Electrical Steel Sheet]

Figure 1:
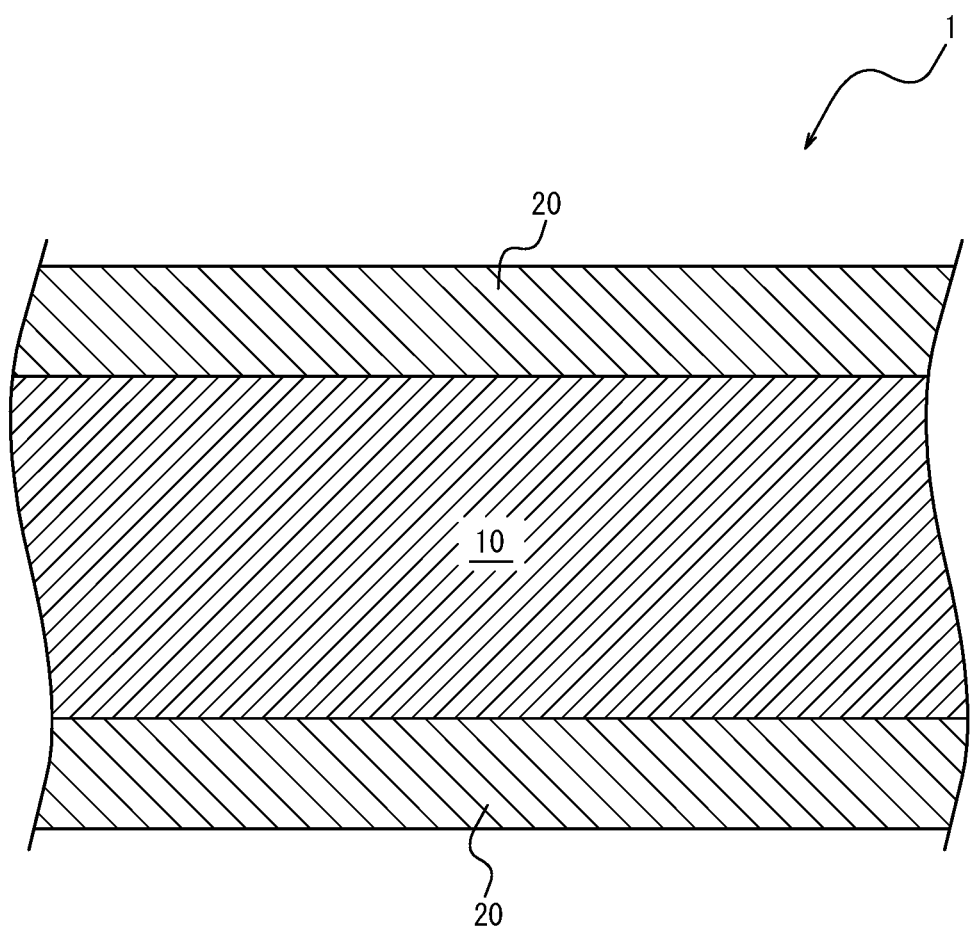
FIG. 1 is a schematic diagram illustrating the structure of a non-oriented electrical steel sheet according to one of the disclosed embodiments.
Figure 2:
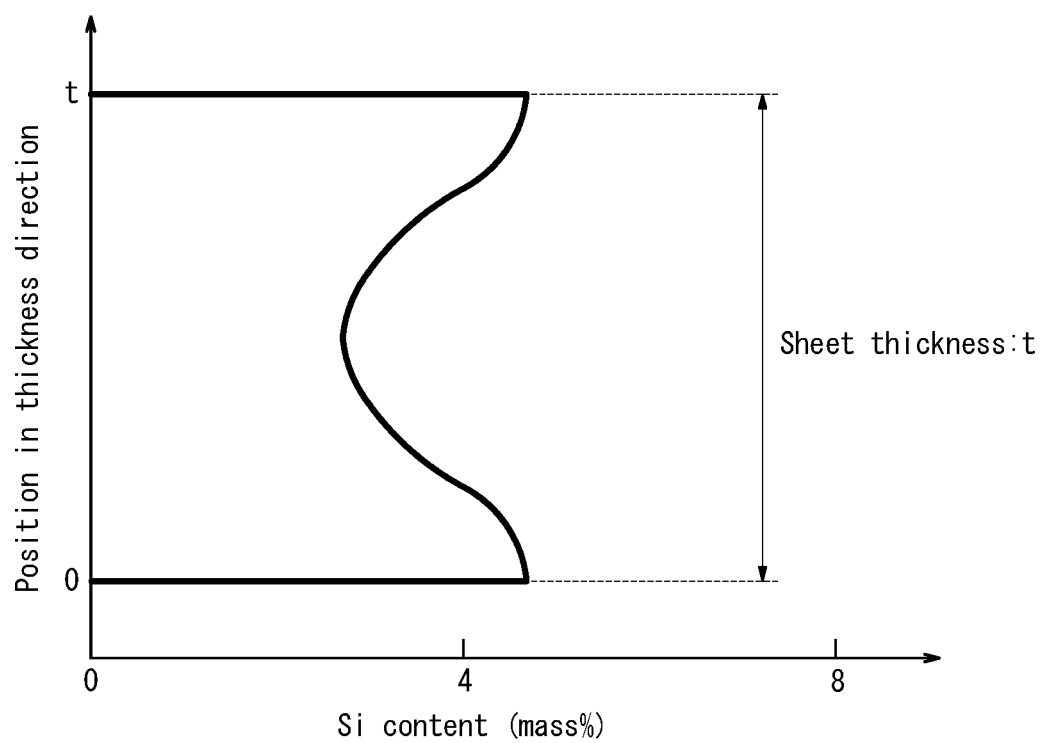
FIG. 2 is a schematic diagram illustrating an example of the Si content profile in a thickness direction of the non-oriented electrical steel sheet.

FIG. 1 is a schematic diagram illustrating the structure of a non-oriented electrical steel sheet according to one of the disclosed embodiments. Further, FIG. 2 is a schematic diagram illustrating an example of the Si content profile in a thickness direction of the non-oriented electrical steel sheet. In FIG. 2, the vertical axis indicates a position in the thickness direction, 0 denotes one surface of the non-oriented electrical steel sheet, and t denotes the other surface of the non-oriented electrical steel sheet.

In the example illustrated in FIG. 2, a non-oriented electrical steel sheet 1 (hereinafter referred to simply as "steel sheet") has a Si content distribution where the Si content continuously decreases from the surfaces toward the mid-thickness direction. The Si content distribution may be a distribution where the Si content continuously varies over the entire thickness direction of the steel sheet, while the Si content distribution may be a distribution where the Si content continuously varies on the surface sides of the steel sheet and remains constant in the mid-thickness part. The Si content near the surfaces of the steel sheet may be slightly reduced, that is, the non-oriented electrical steel sheet 1 may have an inner layer, in which the Si content is less than the average Si content of the total sheet thickness, and surface layers, in which the Si content is greater than or equal to the average Si content of the total sheet thickness, provided on both sides of the inner layer.

Here, when regions where the Si content is greater than or equal to the average Si content of the total sheet thickness are defined as the surface layers and a region where the Si content is less than the average Si content of the total sheet thickness is defined as the inner layer, as illustrated in FIG. 1, it can be said that the non-oriented electrical steel sheet 1 has an inner layer 10 and surface layers 20 provided on both sides of the inner layer 10.

[Chemical Composition]

First, the chemical composition of the non-oriented electrical steel sheet disclosed herein is described. A non-oriented electrical steel sheet according to one of the embodiments of this disclosure has a chemical composition containing Si, C, Mn, and S with the balance being Fe and inevitable impurities. When components are expressed in "%", this refers to "mass %" unless otherwise stated. In the following description, the content of each element except Si refers to the average content of the element in the total sheet thickness of the steel sheet.

C: 0.020% or Less

C is a detrimental element to magnetic properties, and when the C content exceeds 0.020%, iron loss significantly increases due to magnetic aging. The C content is therefore 0.020% or less. On the other hand, a lower C content is preferable from the viewpoint of the magnetic properties. Therefore, no particular lower limit is placed on the C content. However, excessive reduction of the C content leads to an increase in production cost, thus it is preferable that the C content be 0.0001% or more, and it is more preferable that the C content be 0.001% or more.

Mn: 0.010% to 2.0%

Mn is an effective element to improve hot workability. In addition, Mn increases the intrinsic resistance of the steel sheet and consequently has an effect of reducing the iron loss. To achieve the aforementioned effect, the Mn content is 0.010% or more. On the other hand, when the Mn content exceeds 2.0%, the manufacturability is reduced and the cost is increased. The Mn content is therefore 2.0% or less.

S: 0.0100% or Less

S increases the iron loss due to the formation of fine precipitates and the segregation to grain boundaries. The S content is therefore 0.0100% or less. On the other hand, a lower S content is preferable from the viewpoint of the iron loss. Therefore, no particular lower limit is placed on the S content. However, excessive reduction of the S content leads to an increase in production cost, thus it is preferable that the S content be 0.0001% or more.

$[Si]_1$: 2.5% to 7.0%

Si is an element having an effect of increasing the electrical resistance of the steel sheet and reducing eddy current loss. When the average Si content ($[Si]_1$) in each of the surface layers is less than 2.5%, the eddy current loss cannot be effectively reduced. Therefore, the average Si content in each of the surface layers is 2.5% or more, preferably 3.0% or more, and more preferably more than 3.5%. On the other hand, when the average Si content in each of the surface layers exceeds 7.0%, the magnetic flux density decreases due to a decrease in saturation magnetization, and the manufacturability of the non-oriented electrical steel sheet decreases. Therefore, the average Si content in each of the surface layers is 7.0% or less, preferably less than 6.5%, and more preferably 6.0% or less. An average Si content of 2.5% to 7.0% in each of the surface layers means that an average Si content in a surface layer (first surface layer) on one side of the non-oriented electrical steel sheet is 2.5% to 7.0% and an average Si content in a surface layer (second surface layer) on the other side of the non-oriented electrical steel sheet is 2.5% to 7.0%. The average Si content in the first surface layer may be the same as or different from the average Si content in the second surface layer.

$[Si]_0$: 1.5% to 5.0%

When the average Si content ($[Si]_0$) in the inner layer is less than 1.5%, the eddy current loss increases. Therefore, the average Si content in the inner layer is 1.5% or more. On the other hand, when the Si content in the inner layer exceeds 5.0%, problems such as cracking of a motor core in punching the core occur. Therefore, the average Si content in the inner layer is 5.0% or less, preferably 4.0% or less.

In one of the embodiments of this disclosure, the non-oriented electrical steel sheet has a chemical composition containing the above elements with the balance being Fe and inevitable impurities.

[Optional Components]

In another embodiment of this disclosure, the above chemical composition may optionally further contain at least one selected from the group consisting of Al, P, Sn, and Sb each in the following content. The content of each element described below refers to the average content of the element in the total sheet thickness of the steel sheet.

Al: 0.10% or Less

Al is an element having an effect of increasing the intrinsic resistance of the steel sheet, and the addition of Al can further reduce the iron loss. However, when the Al content exceeds 0.10%, the manufacturability is reduced and the cost is increased. Therefore, in the case of adding Al, the Al content is 0.10% or less. On the other hand, no particular lower limit is placed on the Al content. However, in the case of adding Al, to enhance the effect of the addition, the Al content is preferably 0.01% or more.

P: 0.10% or Less

The addition of P greatly improves the texture, which makes it possible to further improve the magnetic flux density and further lower the hysteresis loss. In addition, the addition of P suppresses nitriding of the steel sheet during high temperature annealing and further suppresses an increase in iron loss. On the other hand, when the P content exceeds 0.10%, the effect saturates and the manufacturability is reduced. Therefore, in the case of adding P, the P content is 0.10% or less. On the other hand, no particular lower limit is placed on the P content. However, to enhance the effect of adding P, the P content is preferably 0.001% or more.

Sn: 0.10% or Less

As with P, the addition of Sn greatly improves the texture, which makes it possible to further improve the magnetic flux density and further lower the hysteresis loss. In addition, the addition of Sn suppresses nitriding of the steel sheet during high temperature annealing and further suppresses an increase in iron loss. When the Sn content exceeds 0.10%, the effect saturates, the manufacturability is reduced, and the cost is increased. Therefore, in the case of adding Sn, the Sn content is 0.10% or less. On the other hand, the Sn content may have any lower limit, but to further enhance the effect of adding Sn, the Sn content is preferably 0.001% or more.

Sb: 0.10% or Less

As with P and Sn, the addition of Sb greatly improves the texture, which makes it possible to improve the magnetic flux density and lower the hysteresis loss. In addition, the addition of Sb suppresses nitriding of the steel sheet during high temperature annealing and further suppresses an increase in iron loss. When the Sb content exceeds 0.10%, the effect saturates, the manufacturability is reduced, and the cost is increased. Therefore, in the case of adding Sb, the Sb content is 0.10% or less. On the other hand, the Sb content may have any lower limit, but to achieve the effect of adding Sb, the Sb content is preferably 0.001% or more.

$[Mn][S] \leq 0.0030$

In steel containing Mn and S, MnS precipitates during annealing at a relatively low temperature such as less than 1000° C. Then, the precipitated MnS inhibits crystal grain growth to decrease the crystal grain size of the final non-oriented electrical steel sheet, resulting in an increase in hysteresis loss. In contrast, we perform a siliconizing treatment at a relatively high temperature of 1000° C. or more, which allows MnS to dissolve and form a solute to promote the grain growth. However, when the product [Mn][S] of the average Mn content and the average S content exceeds 0.0030, the grain growth during the siliconizing treatment is inhibited by MnS that remains precipitated, resulting in an increase in hysteresis loss. Therefore, to suppress the increase in hysteresis loss caused by the precipitation of MnS during the siliconizing treatment, it is preferable that the above chemical composition further satisfy the relation of the following formula:

$[Mn][S] \leq 0.0030$, where [Mn] and [S] are average contents in mass % of Mn and S in the total sheet thickness, respectively. On the other hand, no particular lower limit is placed on [Mn][S]. However, from the viewpoint of manufacturability and cost, [Mn][S] is preferably 0.000005 or more.

[Sheet Thickness]

When the non-oriented electrical steel sheet is too thin, handling in the production process such as cold rolling and annealing is difficult, resulting in an increase in production cost. The sheet thickness t of the non-oriented electrical steel sheet is therefore 0.01 mm or more. On the other hand, when the non-oriented electrical steel sheet is too thick, the eddy current loss increases, leading to an increase in the total iron loss. Therefore, t is 0.35 mm or less.

$[t_1/t]$

Next, to examine the effect of the ratio $t_1/t$ (multilayer ratio) of the total thickness $t_1$ of the surface layers to the sheet thickness t of the non-oriented electrical steel sheet, on the magnetic properties, non-oriented electrical steel sheets with different $t_1/t$ were produced by the following procedures and the magnetic properties were evaluated. The "total thickness of the surface layers" indicates the sum of the thicknesses of the surface layers provided on both sides of the non-oriented electrical steel sheet. The surface layers are defined as regions where the Si content is greater than or equal to the average Si content in the total sheet thickness, as described above.

First, a hot-rolled steel sheet was made by hot-rolling a steel slab having a chemical composition containing C: 0.005%, Si: 2.0%, Mn: 0.05%, S: 0.001%, and Sn: 0.04% with the balance being Fe and inevitable impurities. The hot-rolled steel sheet was subjected to hot-rolled sheet annealing at 950° C. for 30 s, and then the steel sheet after the hot-rolled sheet annealing was cold-rolled to obtain a cold-rolled steel sheet having a sheet thickness of 0.2 mm. Next, the cold-rolled steel sheet was subjected to siliconizing treatment in a $SiCl_4$ atmosphere at a siliconizing treatment temperature of 1200° C. to deposit Si on the surface of the steel sheet, followed by diffusion treatment in an $N_2$ atmosphere at a diffusion treatment temperature of 1200° C. so that each of the surface layers had an average Si content $[Si]_1$ of 4.0% and the inner layer had an average Si content $[Si]_0$ of 2.2%. Then, the steel sheet was cooled to 100° C. or less under a set of conditions including the average cooling rate $v_1$ of 15° C./s in the temperature range from the diffusion treatment temperature to 900° C. and the average cooling rate $v_2$ of 40° C./s in the temperature range from 900° C. to 100° C. In each of the non-oriented electrical steel sheets thus obtained, the ratio $t_1/t$ was from 0.05 to 0.80.

A test specimen was taken from each obtained non-oriented electrical steel sheet, and Epstein test was conducted to evaluate the iron loss $W_{10/400}$ (W/kg) at a maximum magnetic flux density of 1.0 T and a frequency of 400 Hz. The evaluation was made in the same manner as described in the EXAMPLES section below.

Figure 3:
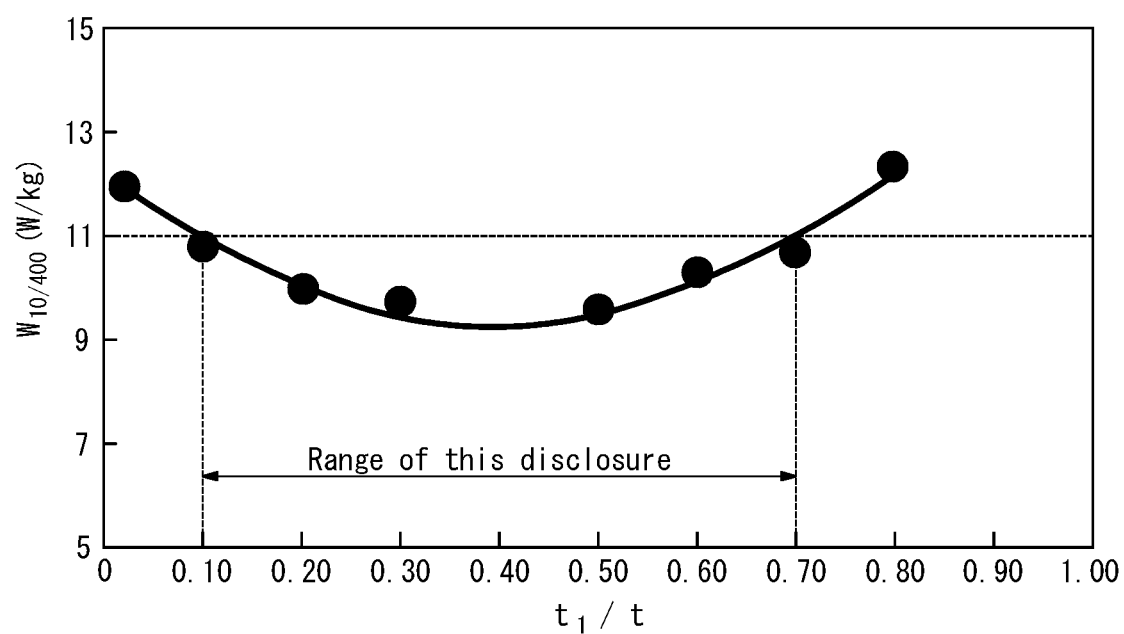
FIG. 3 is a graph illustrating the correlation between a ratio $t_1/t$ of a total thickness $t_1$ of the aforementioned surface layers to a sheet thickness t and an iron loss $W_{10/400}$ (W/kg)

FIG. 3 illustrates the correlation between $t_1/t$ and $W_{10/400}$ (W/kg). From the result, it is found that when $t_1/t$ is from 0.10 to 0.70, the iron loss is greatly reduced. The reduction in the iron loss is believed to be because of the following reasons. First, since the ratio of the surface layers which have high resistance is low when $t_1/t$ is less than 0.10, the eddy current which concentrates on the surface layers cannot be effectively reduced. On the other hand, since the difference in magnetic permeability between the surface layers and the inner layer is small when $t_1/t$ is more than 0.70, the magnetic flux penetrates to the inner surface and the eddy current loss also occurs from the inner surface. Therefore, the iron loss can be reduced by setting $t_1/t$ in a range of from 0.10 to 0.70. For the above reasons, the ratio $t_1/t$ of the total thickness $t_1$ of the surface layers to the sheet thickness t is from 0.10 to 0.70.

[In-Plane Tensile Stress]

We examined to further reduce the iron loss of the non-oriented electrical steel sheet and revealed that in-plane tensile stress is generated as internal stress in the non-oriented electrical steel sheet. The following tests were conducted to examine the effect of the in-plane tensile stress on the magnetic properties of the non-oriented electrical steel sheets.

First, a hot-rolled steel sheet was made by hot-rolling a steel slab having a chemical composition containing C: 0.004%, Si: 2.5%, Mn: 0.07%, S: 0.002%, Sn: 0.04%, and P: 0.01% with the balance being Fe and inevitable impurities. The hot-rolled steel sheet was subjected to hot-rolled sheet annealing at 950° C. for 30 s, and then the steel sheet after the hot-rolled sheet annealing was cold-rolled to obtain a cold-rolled steel sheet having a sheet thickness of 0.2 mm. Next, the cold-rolled steel sheet was subjected to siliconizing treatment in a $SiCl_4$ atmosphere at a siliconizing treatment temperature of 1250° C. to deposit Si on the surface of the steel sheet, followed by diffusion treatment in an $N_2$ atmosphere at a diffusion treatment temperature of 1100° C. Then, the steel sheet was cooled to 100° C. or less under a set of conditions including the average cooling rate $v_1$ of 15° C./s in the temperature range from the diffusion treatment temperature to 900° C. and the average cooling rate $v_2$ of 40° C./s in the temperature range from 900° C. to 100° C. In each of the non-oriented electrical steel sheets thus obtained, the average Si content $[Si]_1$ in each of the surface layers was 3.0% to 7.0%, the average Si content $[Si]_0$ in the inner layer was 2.2% to 2.7%, and $t_1/t$ was 0.30.

A test specimen was taken from each obtained non-oriented electrical steel sheet, and Epstein test was conducted to evaluate the iron loss $W_{10/400}$ (W/kg) at a maximum magnetic flux density of 1.0 T and a frequency of 400 Hz. The evaluation was made in the same manner as described in the EXAMPLES section below.

Next, the in-plane tensile stress was measured by the following procedures. First, each obtained non-oriented electrical steel sheet was subject to the chemical polishing with hydrofluoric acid from one side. Then, the polishing was performed until the sheet thickness $t_S$ of each sample became 0.1 mm so that the sample after polishing would have a surface layer on one surface and the inner layer on the other surface. The sample after the chemical polishing warps such that the surface layer is inward, indicating that tensile stress is generated in the surface layer plane in the sample before the polishing. Therefore, the in-plane tensile stress of the non-oriented electrical steel sheet was calculated from the curvature radius r, which is an index of the magnitude of warpage of the obtained sample, using the following formula:

In-plane tensile stress (MPa)=$t_S \times E/(4 \times r)$, where $t_S$ is the thickness of the sample, 0.1 mm, E is the Young's modulus, 190 GPa, and r is the curvature radius (mm).

Figure 4:
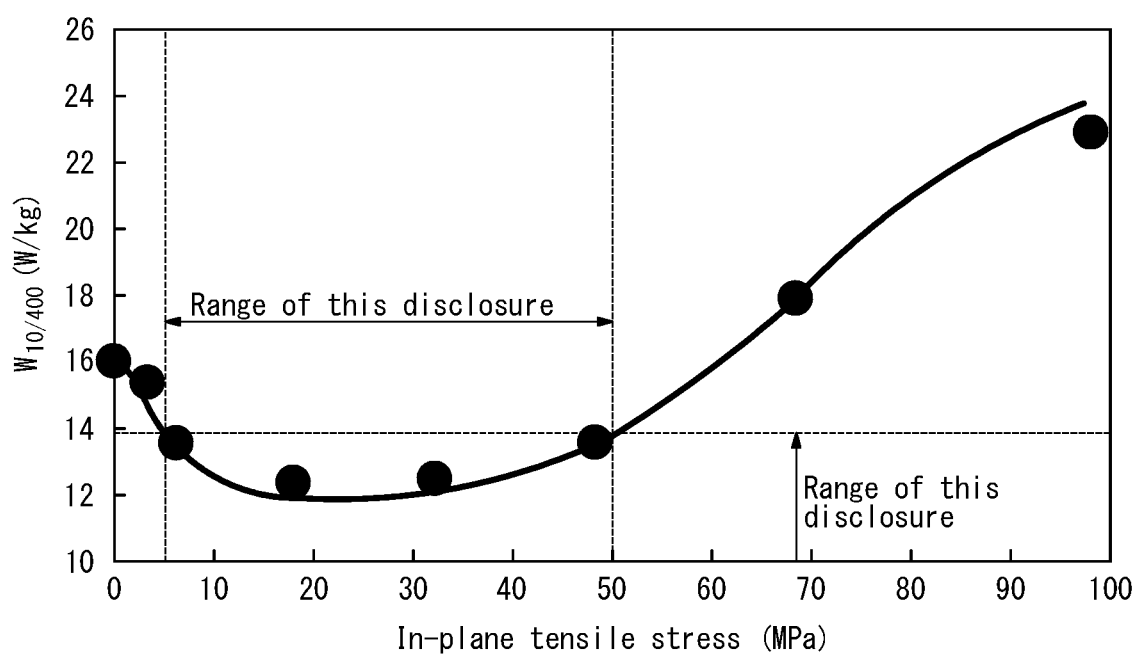
FIG. 4 is a graph illustrating the correlation between an in-plane tensile stress (MPa) and the iron loss $W_{10/400}$ (W/kg)

FIG. 4 illustrates the correlation between the in-plane tensile stress (MPa) and $W_{10/400}$ (W/kg). From the result, it is found that the iron loss is reduced when the in-plane tensile stress is from 5 MPa to 50 MPa. This is believed to be because of the following reasons. Specifically, the tensile stress being generated in the surface layer plane causes the easy magnetization axis to be parallel to the in-plane direction, which concentrates the magnetic flux in the surface layer to reduce the eddy current loss. However, when the internal stress is excessively large, the magnetic flux concentrates in the surface layer and the eddy current loss reduces, but the hysteresis loss significantly increases, resulting in an increase in iron loss. Since not only the eddy current loss but also the hysteresis loss has a significant effect on the iron loss in the frequency range of about 400 Hz, to reduce the iron loss in the frequency range of about 400 Hz, the in-plane tensile stress of the surface layer is 5 MPa to 50 MPa in this disclosure.

Since it is considered that the in-plane tensile stress in the surface layer is mainly generated by the difference in Si concentration between the surface layers and the inner layer, $\Delta Si([Si]_1-[Si]_0)$, to obtain the internal stress, it is preferable that $\Delta Si$ be 1.0% or more. In other words, since $[Si]_1$ is generally higher than $[Si]_0$, it is preferable that the following relation be satisfied: $[Si]_1 \geq \{[Si]_0+1.0 \text{ mass \%}\}$.

[Average N Content]

The average N content [N] in the total sheet thickness of the non-oriented electrical steel sheet disclosed herein is 40 ppm or less. The reasons for this limitation will be described later.

[Iron Loss]

The iron loss was evaluated with the iron loss (total iron loss) $W_{10/400}$ (W/kg) at a maximum magnetic flux density of 1.0 T and a frequency of 400 Hz. The non-oriented electrical steel sheet disclosed herein has $W_{10/400}$ (W/kg) and the sheet thickness t (mm) that satisfy the following formula. The reason is that when the relation of the following formula is not satisfied, an extremely large amount of heat is generated in stator cores, significantly lowering the motor efficiency. Since the iron loss depends on the sheet thickness, the upper limit of the iron loss was defined in the following formula, considering the effect of the sheet thickness.

$W_{10/400} \leq 8+30t$

In electrical steel sheets, the iron loss usually increases when the magnetic flux density is increased. Therefore, typical motor cores are designed to have a magnetic flux density of about 1.0 T. In contrast, the non-oriented electrical steel sheet disclosed herein achieves both high magnetic flux density and low iron loss which are conflicting properties by controlling the chemical compositions of the surface layers and the inner layer, the in-plane tensile stress, and the multilayer ratio of the steel sheet as described above.

[Texture]

By increasing the {100} plane and decreasing the {111} plane in the non-oriented electrical steel sheet, magnetization is facilitated in the plane of the non-oriented electrical steel sheet, making it possible to further improve the magnetic flux density and further reduce the hysteresis loss. Therefore, it is preferable that in a cross section of $\Phi_2=45°$ of the orientation distribution function (ODF) in a plane with a depth of ¼ of the steel thickness t from the surface of the non-oriented electrical steel sheet, the ratio {100}/{111} of an integration degree of {100} plane to an integration degree of {111} plane be 55% or more. On the other hand, when the ratio {100}/{111} becomes excessively large, the workability of the core may be reduced. Therefore, it is preferable that {100}/{111} be 90% or less.

To increase the ratio of the {100} plane, it is effective to make the average heating rate from 200° C. to the siliconizing temperature 20° C./s or more in the heating process during the siliconizing treatment and to add at least one of P, Sn, or Sb, which are segregation elements, in appropriate amounts.

[Production Method]

The method of producing the non-oriented electrical steel sheet disclosed herein is not particularly limited and may be a siliconizing method. When a siliconizing method is used, by subjecting a steel sheet having a constant Si content in the thickness direction to siliconizing treatment and diffusion treatment, the Si content in the surface layers on both sides of the steel sheet can be increased. The non-oriented electrical steel sheet produced by the siliconizing method has the Si content profile illustrated in, for example, FIG. 2.

The following describes a method of producing a non-oriented electrical steel sheet using the siliconizing method according to one of the embodiments of this disclosure.

In the method of producing the non-oriented electrical steel sheet according to one of the embodiments of this disclosure, the non-oriented electrical steel sheet is produced by sequentially applying the following processes (1) to (3) to the steel sheet.

(1) Siliconizing treatment
(2) Diffusion treatment
(3) Cooling

As a steel sheet to which the aforementioned processes are applied, a steel sheet having a Si content of 1.5% to 5.0% can be used. The steel sheet preferably has a chemical composition that is approximately uniform in the thickness direction. Although the chemical composition of the steel sheet is not particularly limited, it may be the same as that of the non-oriented electrical steel sheet disclosed herein, except for Si.

According to one of the embodiments of this disclosure, as the steel sheet to which the aforementioned processes are applied, it is preferable to use a steel sheet having a chemical composition containing:

Si: 1.5% to 5.0%,
C: 0.020% or less,
Mn: 0.010% to 2.0%, and
S: 0.0100% or less with the balance being Fe and inevitable impurities.

In another embodiment of this disclosure, the chemical composition of the steel sheet can further contain at least one selected from the group consisting of:

Al: 0.10 mass % or less,
P: 0.1 mass % or less,
Sn: 0.10 mass % or less, and
Sb: 0.10 mass % or less.

It is preferable that the chemical composition of the steel sheet further satisfy the following formula:

[Mn][S]≤0.0030, where [Mn] and [S] are average contents in mass % of Mn and S in the total sheet thickness, respectively.

(1) Siliconizing Treatment

First, the steel sheet is subjected to the siliconizing treatment. The siliconizing treatment is performed in a $SiCl_4$ atmosphere at a siliconizing treatment temperature of 1000° C. or more and 1300° C. or less. When the siliconizing treatment temperature is less than 1000° C., the reaction between $SiCl_4$ and the base metal is slow, reducing the manufacturability and increasing the cost. In addition, since the melting point decreases as the Si content in the surface layers of the steel sheet increases by the siliconizing treatment, when the siliconizing treatment is applied at a high temperature exceeding 1300° C., the steel sheet breaks in the furnace and the manufacturability is reduced. Therefore, the siliconizing treatment temperature is 1000° C. or more and 1300° C. or less.

(2) Diffusion Treatment

Next, the steel sheet after the siliconizing treatment is subjected to the diffusion treatment. The diffusion treatment is performed in an $N_2$ atmosphere at a temperature of 950° C. or more and 1300° C. or less. The diffusion treatment also can be performed in an Ar atmosphere, but this is not practical because of the increased cost, and from an industrial point of view, the diffusion treatment is performed in the $N_2$ atmosphere. When the diffusion treatment is performed at a temperature of less than 950° C., the diffusion rate slows down and the manufacturability is reduced. On the other hand, since the melting point decreases as the Si content in the surface layers of the steel sheet increases by the siliconizing treatment, when the diffusion treatment is applied at a high temperature exceeding 1300° C., the steel sheet breaks in the furnace and the manufacturability is reduced. Therefore, the diffusion treatment temperature is 950° C. or more and 1300° C. or less.

(3) Cooling

Then, the steel sheet after the diffusion treatment is cooled under a set of conditions including the average cooling rate of $v_1$ of 5° C./s to 20° C./s in the temperature range from the diffusion treatment temperature to 900° C. and the average cooling speed $v_2$ of 30° C./s to 100° C./s in the temperature range from 900° C. to 100° C.

Here, the experiments conducted to determine the average cooling rates in the cooling process are described.

First, a hot-rolled steel sheet was made by hot-rolling a steel slab having a chemical composition containing C: 0.005%, Si: 2.5%, Mn: 0.06%, S: 0.003%, Sn: 0.06%, and P: 0.06% with the balance being Fe and inevitable impurities. The hot-rolled steel sheet was subjected to hot-rolled sheet annealing at 950° C. for 30 s, and then the steel sheet after the hot-rolled sheet annealing was cold-rolled to obtain a cold-rolled steel sheet having a sheet thickness of 0.2 mm. Next, the cold-rolled steel sheet was subjected to siliconizing treatment in a $SiCl_4$ atmosphere at a siliconizing treatment temperature of 1200° C. to deposit Si on the surface of the steel sheet, and then diffusion treatment is performed in an $N_2$ atmosphere at a diffusion treatment temperature of 1100° C. so that each of the surface layers had an average Si content $[Si]_1$ of 4.5%. Then, the steel sheet was cooled to 100° C. or less under a set of conditions including the average cooling rate $v_1$ of 5° C./s to 35° C./s in the temperature range from the diffusion treatment temperature to 900° C. and the average cooling rate $v_2$ of 5° C./s to 120°

C./s in the temperature range from 900° C. to 100° C. In each of the non-oriented electrical steel sheets thus obtained, the ratio $t_1/t$ was 0.30.

A test specimen was taken from each obtained non-oriented electrical steel sheet, and Epstein test was conducted to evaluate the iron loss $W_{10/400}$ (W/kg) at a maximum magnetic flux density of 1.0 T and a frequency of 400 Hz. The evaluation was made in the same manner as described in the EXAMPLES section below.

Figure 5:
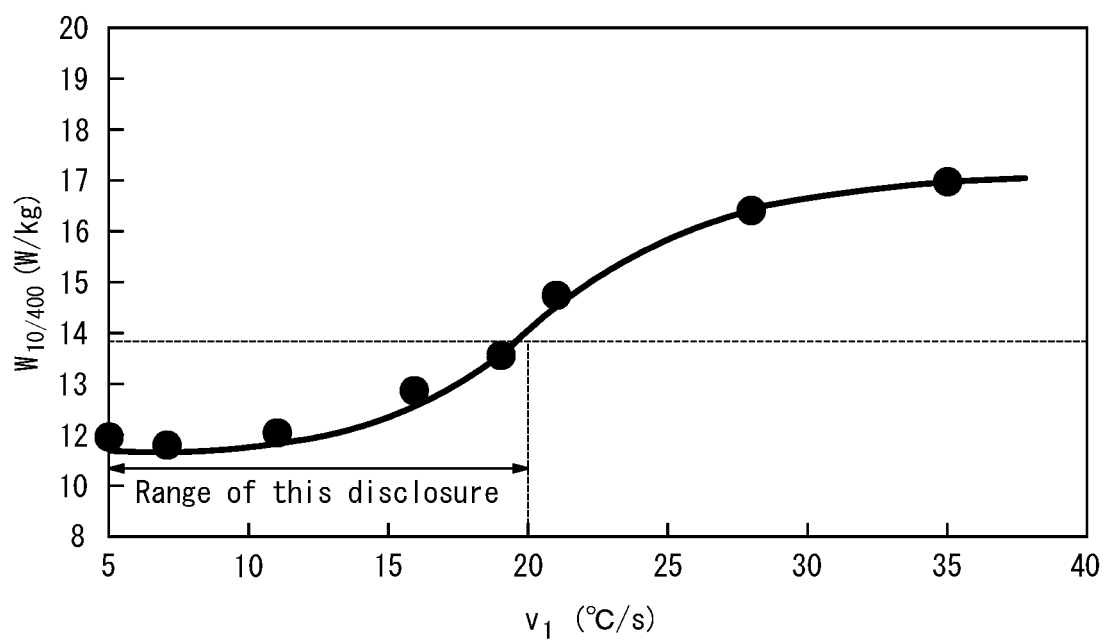
FIG. 5 is a graph illustrating the correlation between an average cooling rate $v_1$ (° C./s) and the iron loss $W_{10/400}$ (W/kg) in the temperature range from a diffusion treatment temperature to 900° C. in a cooling process.

FIG. 5 illustrates the correlation between the average cooling rate $v_1$ (° C./s) and the iron loss $W_{10/400}$ (W/kg) when the average cooling rate $v_2$ is kept constant at 45° C./s. As can be seen from the result, the iron loss increases when the average cooling rate $v_1$ exceeds 20° C./s. This is considered to be because when the average cooling rate $v_1$ exceeds 20° C./s, rapid cooling causes strain in the steel sheet, resulting in an increase in hysteresis loss. Therefore, the average cooling rate $v_1$ is 20° C./s or less. On the other hand, when $v_1$ is less than 5° C./s, the production efficiency decreases and the cost increases. Therefore, $v_1$ is 5° C./s or more.

Figure 6:
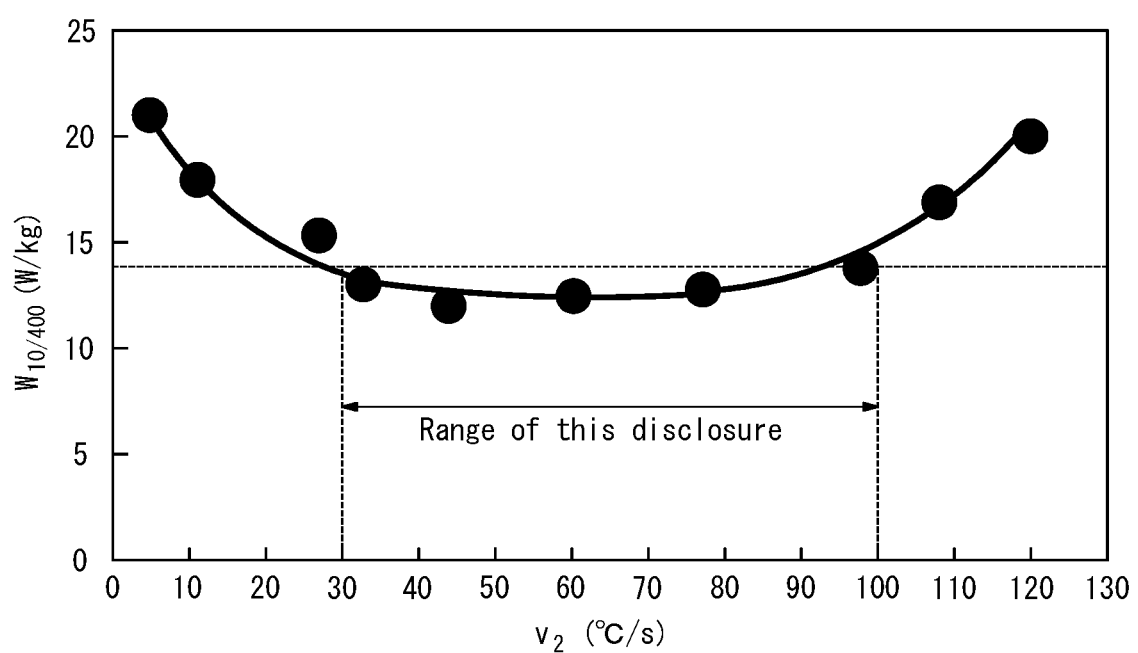
FIG. 6 is a graph illustrating the correlation between an average cooling rate $v_2$ (° C./s) and the iron loss $W_{10/400}$ (W/kg) in the temperature range from 900° C. to 100° C. in the cooling process.

FIG. 6 illustrates the correlation between the average cooling rate $v_2$ (° C./s) and the iron loss $W_{10/400}$ (W/kg) when the average cooling rate $v_1$ is kept constant at 10° C./s. As can be seen from the result, the iron loss increased when the average cooling rate $v_2$ was less than 30° C./s.

Figure 7:
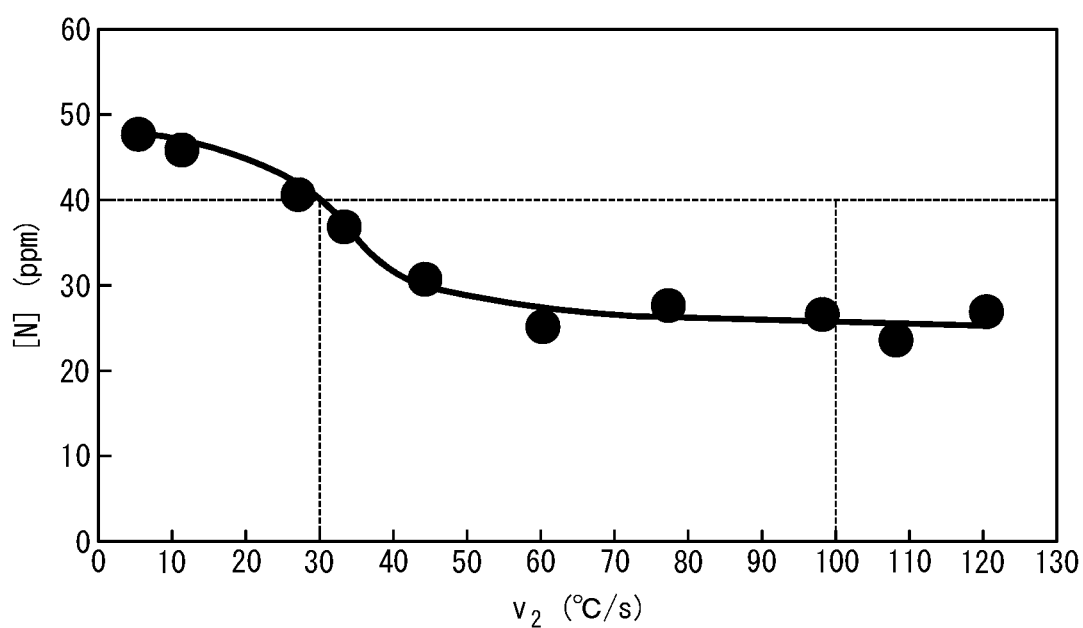
FIG. 7 is a graph illustrating the correlation between the average cooling rate $v_2$ (° C./s) in the temperature range from 900° C. to 100° C. in the cooling process and an average N content [N] (ppm) in the total sheet thickness of the non-oriented electrical steel sheet.

To examine the cause of this result, the average N content [N] in the total sheet thickness of the non-oriented electrical steel sheet obtained under each condition was measured. FIG. 7 illustrates the correlation between the average cooling rate $v_2$ (° C./s) and the measured average N content [N] (ppm). The average N content [N] was measured by the method described in the EXAMPLES section below. From the result illustrated in FIG. 7, it was revealed that when the average cooling rate $v_2$ is less than 30° C./s, [N] is higher than that when $v_2$ is 30° C./s or more. From this result, it is considered that the iron loss increased by nitriding of the steel sheet when the average cooling rate $v_2$ was less than 30° C./s. Therefore, in the non-oriented electrical steel sheet according to one of the embodiments of this disclosure, the average N content [N] in the total sheet thickness is 40 ppm or less. In the method of producing the non-oriented electrical steel sheet in one of the embodiments of this disclosure, the average cooling speed $v_2$ is 30° C./s or more.

On the other hand, from the results illustrated in FIGS. 6 and 7, it can be seen that when the average cooling rate $v_2$ exceeds 100° C./s, the iron loss increases even though the amount of nitrogen in the steel is 30 ppm or less. This is considered to be due to the increase in iron loss caused by the cooling strain when the average cooling rate $v_2$ exceeds 100° C./s. For this reason, the average cooling speed $v_2$ is 100° C./s or less.

EXAMPLES

Example 1

To determine the effect, non-oriented electrical steel sheets were produced in the following procedures and the magnetic properties were evaluated.

First, steel slabs containing Si: 2.0% to 4.0% were prepared. The chemical composition of each steel slab was adjusted by blowing the steel slab in a converter and subsequently subjecting it to degassing treatment. Next, each steel slab was heated at 1140° C. for 1 hour, and subsequently hot rolled to obtain a hot-rolled steel sheet having a sheet thickness of 2 mm. The hot rolling finish temperature in the hot rolling was set to 800° C. Each hot-rolled steel sheet was coiled at a coiling temperature of 610° C., and then subjected to the hot-rolled sheet annealing of 900° C. for 30 s to obtain a hot-rolled and annealed sheet. After that, each hot-rolled and annealed sheet was subjected to acid cleaning and the cold rolling to obtain a cold-rolled steel sheet.

Then, each obtained cold-rolled steel sheet was subjected to the siliconizing treatment in a $SiCl_4$ atmosphere at a siliconizing treatment temperature of 1200° C. In the heating process of the siliconizing treatment, the heating rate from 200° C. to the siliconizing treatment temperature was changed between 10° C./s and 40° C./s. After that, each steel sheet was subjected to the diffusion treatment and the cooling in an $N_2$ atmosphere under a set of conditions presented in Tables 1 and 2 to obtain a non-oriented electrical steel sheet having each sheet thickness t presented in Tables 1 and 2. Here, the average cooling rate $v_1$ represents the average cooling rate from the diffusion treatment temperature to 900° C., and the average cooling rate $v_2$ represents the average cooling rate from 900° C. to 100° C.

(Composition)

Each of the non-oriented electrical steel sheets thus obtained was embedded in a carbon mold, and the Si content distribution in the cross section in the thickness direction was measured using Electron Probe Micro Analyzer (EPMA). The average of the Si contents over the total sheet thickness of each steel sheet was calculated, and parts having a higher Si concentration than the average were defined as surface layers and a part having a lower Si concentration than the average was defined as an inner layer. From the obtained result, the ratio $t_1/t$ of the total thickness $t_1$ of the surface layers to the sheet thickness t, the average Si content $[Si]_1$ in each of the surface layers, and the average Si content $[Si]_0$ in the inner layer were obtained. In addition, the average N content [N] in the total sheet thickness of each non-oriented electrical steel sheet was measured using ICP spectrometry. The measurement results are presented in Tables 1 and 2.

Also for the components other than Si and N contained in the obtained non-oriented electrical steel sheets, the average contents in the total sheet thickness were measured using the ICP spectrometry. The measurement results are presented in Tables 1 and 2.

(Internal Stress)

To measure the internal stress, a test specimen with a width of 30 mm and a length of 180 mm was taken as a sample from each of the obtained non-oriented electrical steel sheets, and the sample was subject to the chemical polishing with hydrofluoric acid from one side. Then, the polishing was performed until the sheet thickness $t_S$ of the sample became $t/2$ so that the sample after polishing would have a surface layer on one surface and the inner layer on the other surface. Then, the in-plane tensile stress was calculated from the magnitude of warpage of the sample using the following formula (2):

$$\text{In-plane tensile stress (MPa)} = t_S \times E/(4 \times r) \qquad (2),$$

where $t_S$ is the thickness of the sample,

E is the Young's modulus, 190 GPa, and r is the curvature radius (mm).

(Texture)

To examine the texture of the obtained non-oriented electrical steel sheets, each obtained non-oriented electrical steel sheet was subject to the chemical polishing to ¼ of the sheet thickness from the surface, and X-ray ODF analysis was performed to obtain the ratio {100}/{111} of an integration degree of {100} plane to an integration degree of {111} plane in a cross section with $\Phi_2=45°$ of the orientation distribution function. The measurement results are presented in Tables 1 and 2.

(Iron Loss)

Test specimens with a width of 30 mm and a length of 180 mm were taken from each of the obtained non-oriented electrical steel sheets, and Epstein test was conducted to measure the iron loss $W_{10/400}$ (W/kg) at a maximum magnetic flux density of 1.0 T and a frequency of 400 Hz. The Epstein test was conducted using a 25-cm Epstein frame in accordance with JIS C 2550-1. In the Epstein test, L-direction test specimens were collected so that the longitudinal direction of the test specimens was parallel to the rolling direction (L direction) and C-direction test specimens were collected so that the longitudinal direction of the test specimens was parallel to the direction orthogonal to the rolling direction (C direction). The L- and C-direction test specimens were used in equal amounts to evaluate the averages of the magnetic properties in the L direction and the C direction. The measurement results are presented in Tables 1 and 2.

As can be seen from the results presented in Tables 1 and 2, the non-oriented electrical steel sheet satisfying the conditions disclosed herein had an excellent property of low iron loss at 400 Hz. In contrast, in the comparative examples that did not meet the conditions disclosed herein, the iron loss was high. In some of the comparative examples, the steel sheet fractured during the production, so the evaluation of iron loss could not be performed.

TABLE 1

| No. | $[Si]_1$ | $[Si]_2$ | C | S | Mn | Al | P | Sn | Sb | [N] (ppm) | [Mn] [S] |
|---|---|---|---|---|---|---|---|---|---|---|---|
| 1 | 3.4 | 2.0 | 0.0046 | 0.0008 | 0.051 | — | — | — | — | 30 | 0.0000 |
| 2 | 4.0 | 2.0 | 0.0180 | 0.0006 | 0.050 | — | — | — | — | 28 | 0.0000 |
| 3 | 4.6 | 2.0 | 0.0029 | 0.0010 | 0.880 | 0.05 | — | — | — | 31 | 0.0009 |
| 4 | 5.0 | 2.0 | 0.0045 | 0.0008 | 0.090 | — | — | — | — | 23 | 0.0001 |
| 5 | 6.6 | 2.0 | 0.0027 | 0.0007 | 0.030 | — | — | — | — | 23 | 0.0000 |
| 6 | 5.2 | 2.0 | 0.0023 | 0.0012 | 0.072 | — | — | — | — | 28 | 0.0001 |
| 7 | 5.0 | 2.0 | 0.0040 | 0.0011 | 0.067 | — | — | — | — | 42 | 0.0001 |
| 8 | 3.0 | 2.3 | 0.0036 | 0.0009 | 0.054 | — | — | — | — | 28 | 0.0000 |
| 9 | 4.2 | 2.3 | 0.0041 | 0.0010 | 0.055 | — | — | — | — | 37 | 0.0001 |
| 10 | 4.2 | 2.3 | 0.0027 | 0.0004 | 0.080 | — | — | — | — | 24 | 0.0000 |
| 11 | 4.3 | 2.5 | 0.0022 | 0.0003 | 1.540 | — | — | — | — | 27 | 0.0005 |
| 12 | — | 2.5 | 0.0031 | 0.0018 | 2.310 | — | — | — | — | — | 0.0042 |
| 13 | 4.0 | 2.5 | 0.0041 | 0.0094 | 0.040 | — | 0.01 | 0.01 | 0.001 | 24 | 0.0004 |
| 14 | 5.5 | 2.5 | 0.0038 | 0.0016 | 0.167 | — | 0.02 | 0.01 | 0.001 | 26 | 0.0003 |
| 15 | 3.4 | 2.5 | 0.0045 | 0.0020 | 0.050 | — | 0.08 | — | — | 22 | 0.0001 |
| 16 | 5.0 | 2.5 | 0.0028 | 0.0031 | 0.061 | — | 0.001 | 0.001 | 0.06 | 22 | 0.0002 |
| 17 | 4.4 | 3.0 | 0.0038 | 0.0005 | 1.200 | — | 0.01 | 0.01 | 0.001 | 30 | 0.0006 |
| 18 | 5.1 | 3.0 | 0.0046 | 0.0016 | 0.160 | — | — | 0.06 | — | 29 | 0.0003 |
| 19 | 5.5 | 3.0 | 0.0036 | 0.0009 | 0.038 | 0.07 | 0.05 | 0.01 | 0.001 | 30 | 0.0000 |
| 20 | 4.2 | 3.0 | 0.0020 | 0.0013 | 0.020 | — | — | — | — | 32 | 0.0000 |
| 21 | 6.3 | 3.0 | 0.0046 | 0.0004 | 0.180 | — | 0.05 | 0.01 | 0.001 | 23 | 0.0001 |

| No. | Diffusion treatment temperature [° C.] | $v_1$ (° C./s) | $v_2$ (° C./s) | t (mm) | $t_1/t$ | In-plane tensile stress (MPa) | Texture {100}/{111} (%) | Iron loss $W_{10/400}$ (W/kg) | Remarks |
|---|---|---|---|---|---|---|---|---|---|
| 1 | 1050 | 16 | 33 | 0.20 | 0.30 | 11.5 | 56 | 13.4 | Example |
| 2 | 1000 | 13 | 60 | 0.20 | 0.30 | 21.1 | 58 | 13.2 | Example |
| 3 | 1100 | 15 | 43 | 0.20 | 0.30 | 34.0 | 64 | 11.6 | Example |
| 4 | 1250 | 14 | 95 | 0.20 | 0.30 | 44.4 | 68 | 13.4 | Example |
| 5 | 1230 | 20 | 81 | 0.20 | 0.60 | 100.4 | 69 | 21.6 | Comparative Example |
| 6 | 1200 | 7 | 63 | 0.10 | 0.50 | 50.0 | 79 | 10.2 | Example |
| 7 | 1280 | 11 | 25 | 0.10 | 0.30 | 44.4 | 86 | 15.4 | Comparative Example |
| 8 | 1180 | 13 | 50 | 0.20 | 0.30 | 5.0 | 72 | 13.4 | Example |
| 9 | 1100 | 19 | 44 | 0.20 | 0.30 | 19.3 | 77 | 12.5 | Example |
| 10 | 1260 | 6 | 110 | 0.10 | 0.30 | 19.3 | 74 | 15.0 | Comparative Example |
| 11 | 1200 | 14 | 46 | 0.20 | 0.30 | 17.6 | 66 | 12.2 | Example |
| 12 | — | — | — | 0.10 | Fracture during cold rolling | | | | Comparative Example |
| 13 | 1200 | 12 | 70 | 0.20 | 0.30 | 12.9 | 78 | 12.3 | Example |
| 14 | 1050 | 10 | 64 | 0.20 | 0.80 | 44.4 | 73 | 14.6 | Comparative Example |
| 15 | 1000 | 18 | 82 | 0.10 | 0.30 | 5.9 | 73 | 9.2 | Example |
| 16 | 1025 | 14 | 96 | 0.10 | 0.30 | 31.7 | 72 | 8.0 | Example |
| 17 | 1000 | 17 | 31 | 0.20 | 0.05 | 11.5 | 63 | 14.8 | Comparative Example |

TABLE 1-continued

| 18 | 1010 | 11 | 37 | 0.20 | 0.30 | 23.1 | 76 | 10.1 | Example |
| 19 | 1025 | 8 | 68 | 0.20 | 0.30 | 31.7 | 73 | 11.2 | Example |
| 20 | 1050 | 10 | 78 | 0.20 | 0.30 | 9.0 | 51 | 13.9 | Example |
| 21 | 1200 | 14 | 92 | 0.10 | 0.30 | 48.6 | 77 | 10.7 | Example |

*The balance is composed of Fe and inevitable impurity.

TABLE 2

| | Chemical composition (mass %)* | | | | | | | | | | |
|---|---|---|---|---|---|---|---|---|---|---|---|
| No. | $[Si]_1$ | $[Si]_2$ | C | S | Mn | Al | P | Sn | Sb | [N] (ppm) | [Mn]/[S] |
| 22 | 6.4 | 3.0 | 0.0190 | 0.0108 | 0.060 | — | — | — | — | 23 | 0.0006 |
| 23 | 4.2 | 3.3 | 0.0094 | 0.0004 | 0.610 | — | — | — | — | 38 | 0.0002 |
| 24 | 5.0 | 3.3 | 0.0083 | 0.0020 | 0.053 | — | — | — | — | 32 | 0.0001 |
| 25 | 6.4 | 3.3 | 0.0140 | 0.0013 | 0.054 | — | 0.05 | 0.01 | 0.001 | 29 | 0.0001 |
| 26 | — | 3.3 | 0.0160 | 0.0008 | 0.600 | — | 0.15 | — | — | — | 0.0005 |
| 27 | 4.2 | 3.3 | 0.0054 | 0.0008 | 0.611 | — | 0.05 | 0.01 | 0.001 | 24 | 0.0005 |
| 28 | 5.1 | 3.5 | 0.0022 | 0.0013 | 0.089 | — | 0.05 | 0.01 | 0.001 | 27 | 0.0001 |
| 29 | 5.0 | 3.5 | 0.0036 | 0.0007 | 0.061 | — | 0.05 | 0.01 | 0.001 | 27 | 0.0000 |
| 30 | 5.6 | 3.5 | 0.0026 | 0.0005 | 0.399 | — | 0.05 | 0.01 | 0.001 | 25 | 0.0002 |
| 31 | 6.3 | 3.5 | 0.0047 | 0.0020 | 0.090 | — | 0.04 | 0.01 | 0.08 | 26 | 0.0002 |
| 32 | — | 3.5 | 0.0045 | 0.0018 | 0.068 | — | — | 0.16 | — | — | 0.0001 |
| 33 | — | 3.5 | 0.0038 | 0.0004 | 0.710 | — | — | — | 0.13 | — | 0.0003 |
| 34 | 6.6 | 3.5 | 0.0021 | 0.0011 | 0.056 | — | 0.01 | 0.001 | 0.05 | 28 | 0.0001 |
| 35 | 4.9 | 4.0 | 0.0033 | 0.0012 | 0.090 | — | — | 0.02 | 0.03 | 28 | 0.0001 |
| 36 | 6.6 | 4.0 | 0.0049 | 0.0006 | 0.103 | — | 0.01 | 0.03 | 0.01 | 27 | 0.0001 |
| 37 | 5.4 | 4.0 | 0.0034 | 0.0007 | 0.319 | — | 0.001 | 0.10 | 0.001 | 23 | 0.0002 |
| 38 | 4.3 | 4.0 | 0.0041 | 0.0007 | 0.185 | 0.02 | — | — | — | 22 | 0.0001 |
| 39 | 5.8 | 4.0 | 0.0045 | 0.0013 | 0.865 | 0.03 | — | — | — | 26 | 0.0011 |
| 40 | 6.3 | 4.0 | 0.0250 | 0.0008 | 1.210 | 0.04 | — | — | — | 34 | 0.0010 |
| 41 | 3.3 | 2.5 | 0.0031 | 0.0010 | 1.980 | 0.04 | — | — | — | 29 | 0.0020 |
| 42 | 4.1 | 2.5 | 0.0022 | 0.0009 | 0.080 | 0.08 | — | — | — | 31 | 0.0001 |
| 43 | — | 2.3 | 0.0038 | 0.0007 | 0.120 | 0.15 | — | — | — | — | 0.0001 |

| | Production conditions | | | | | Internal stress | | | |
|---|---|---|---|---|---|---|---|---|---|
| No. | Diffusion treatment temperature [° C.] | $v_1$ (° C./s) | $v_2$ (° C./s) | t (mm) | $t_1/t$ | In-plane tensile stress (MPa) | Texture {100}/{111} (%) | Iron loss $W_{10/400}$ (W/kg) | Remarks |
| 22 | 1160 | 17 | 99 | 0.10 | 0.30 | 56.2 | 63 | 14.1 | Comparative Example |
| 23 | 1000 | 12 | 63 | 0.10 | 0.30 | 5.9 | 61 | 9.6 | Example |
| 24 | 1000 | 15 | 34 | 0.20 | 0.30 | 15.9 | 58 | 11.9 | Example |
| 25 | 1000 | 8 | 39 | 0.20 | 0.30 | 47.2 | 65 | 13.5 | Example |
| 26 | — | — | — | 0.20 | Fracture during cold rolling | | | | Comparative Example |
| 27 | 1200 | 10 | 83 | 0.20 | 0.30 | 5.9 | 68 | 12.2 | Example |
| 28 | 1280 | 8 | 40 | 0.20 | 0.30 | 14.4 | 64 | 13.7 | Example |
| 29 | 1140 | 23 | 48 | 0.20 | 0.30 | 12.9 | 69 | 16.0 | Comparative Example |
| 30 | 1160 | 17 | 86 | 0.20 | 0.30 | 23.1 | 67 | 12.8 | Example |
| 31 | 1000 | 19 | 62 | 0.20 | 0.30 | 39.0 | 73 | 12.6 | Example |
| 32 | — | — | — | 0.20 | Fracture when passing through looper | | | | Comparative Example |
| 33 | — | — | — | 0.10 | Fracture during cold rolling | | | | Comparative Example |
| 34 | 1100 | 13 | 40 | 0.20 | 0.30 | 47.2 | 66 | 13.4 | Example |
| 35 | 1210 | 18 | 66 | 0.20 | 0.30 | 5.9 | 77 | 9.3 | Example |
| 36 | 1060 | 19 | 53 | 0.20 | 0.30 | 34.0 | 75 | 12.7 | Example |
| 37 | 1190 | 10 | 84 | 0.20 | 0.30 | 11.5 | 89 | 10.8 | Example |
| 38 | 1020 | 19 | 96 | 0.20 | 0.30 | 2.2 | 81 | 14.2 | Comparative Example |
| 39 | 1000 | 16 | 52 | 0.10 | 0.30 | 17.6 | 84 | 8.7 | Example |
| 40 | 1000 | 13 | 64 | 0.20 | 0.30 | 33.7 | 61 | 14.3 | Comparative Example |
| 41 | 1280 | 16 | 32 | 0.20 | 0.30 | 5.1 | 70 | 13.1 | Example |
| 42 | 1050 | 18 | 84 | 0.20 | 0.30 | 14.4 | 56 | 11.5 | Example |
| 43 | — | — | — | 0.10 | Fracture during cold rolling | | | | Comparative Example |

*The balance is composed of Fe and inevitable impurity.

Example 2

Steel slabs containing the components presented in Table 3 were prepared. Each steel slab was heated at 1140° C. for 1 hour, and then hot rolled at a hot rolling finishing temperature of 800° C. to obtain a hot rolled steel sheet with a thickness of 2 mm. Each obtained hot-rolled steel sheet was coiled at 610° C. and then subjected to hot-rolled sheet annealing at 950° C. for 30 s to obtain a hot-rolled and annealed sheet. After that, each hot-rolled and annealed sheet was subjected to acid cleaning and cold rolling to obtain a cold-rolled steel sheet having the thickness presented in Table 3.

Then, each obtained cold-rolled steel sheet was subjected to siliconizing treatment in a $SiCl_4+N_2$ atmosphere at a siliconizing treatment temperature of 1200° C. After that, each steel sheet was subjected to diffusion treatment in an $N_2$ atmosphere at 1150° C., and then cooled at the average cooling rate $v_1$ of 20° C./s from 1150° C. to 900° C. and the average cooling rate $v_2$ of 6° C./s from 900° C. to 100° C. The siliconizing treatment was applied to form the surface layer and the inner layer so that the ratio $t_1/t$ was 0.40.

For each of the obtained non-oriented electrical steel sheets, the composition, internal stress, texture, and iron loss were evaluated in the same manner as in Example 1 above. The evaluation results are presented in Table 3.

As can be seen from the results presented in Table 3, the non-oriented electrical steel sheets with [Mn][S] of 0.0030 or less have lower iron loss compared to those with [Mn][S] of more than 0.0030.

TABLE 3

| | Chemical composition (mass %)* | | | | | | | | | | |
|---|---|---|---|---|---|---|---|---|---|---|---|
| No. | $[Si]_1$ | $[Si]_2$ | C | S | Mn | Al | P | Sn | Sb | [N] (ppm) | [Mn][S] |
| 44 | 4.2 | 2.0 | 0.0064 | 0.0015 | 0.150 | — | — | — | — | 33 | 0.0002 |
| 45 | 4.0 | 2.1 | 0.0061 | 0.0020 | 1.800 | — | — | — | — | 21 | 0.0036 |
| 46 | 4.2 | 2.0 | 0.0066 | 0.0080 | 0.520 | — | — | — | — | 28 | 0.0042 |
| 47 | 4.1 | 2.3 | 0.0061 | 0.0091 | 0.220 | — | — | — | — | 27 | 0.0020 |
| 48 | 4.1 | 2.0 | 0.0063 | 0.0018 | 1.600 | — | — | — | — | 29 | 0.0029 |
| 49 | 4.0 | 2.0 | 0.0062 | 0.0096 | 0.290 | — | — | — | — | 34 | 0.0028 |
| 50 | 4.0 | 2.0 | 0.0059 | 0.0098 | 0.320 | — | — | — | — | 35 | 0.0031 |
| 51 | 4.2 | 2.1 | 0.0060 | 0.0014 | 1.980 | — | — | — | — | 31 | 0.0028 |
| 52 | 4.1 | 2.2 | 0.0055 | 0.0016 | 1.990 | — | — | — | — | 33 | 0.0032 |
| 53 | 4.2 | 2.0 | 0.0060 | 0.0099 | 0.010 | — | — | — | — | 32 | 0.0001 |
| 54 | 4.0 | 2.6 | 0.0034 | 0.0015 | 0.080 | — | — | — | — | 32 | 0.00012 |
| 55 | 4.1 | 2.6 | 0.0034 | 0.0015 | 0.080 | — | — | — | — | 32 | 0.00012 |
| 56 | 4.0 | 2.6 | 0.0034 | 0.0015 | 0.080 | — | — | — | — | 32 | 0.00012 |
| 57 | 4.2 | 2.6 | 0.0034 | 0.0015 | 0.080 | — | — | — | — | 32 | 0.00012 |

| | Production conditions | | | | | Internal stress | Texture | Iron loss | |
|---|---|---|---|---|---|---|---|---|---|
| No. | Diffusion treatment temperature [° C.] | $v_1$ (° C./s) | $v_2$ (° C./s) | t (mm) | $t_1/t$ | In-plane tensile stress (MPa) | {100}/{111} (%) | $W_{10/400}$ (W/kg) | Remarks |
| 44 | 1150 | 20 | 6 | 0.10 | 0.40 | 21.5 | 63 | 10.1 | Example |
| 45 | 1150 | 20 | 6 | 0.10 | 0.40 | 21.8 | 71 | 11.9 | Example |
| 46 | 1150 | 20 | 6 | 0.10 | 0.40 | 21.1 | 70 | 12.4 | Example |
| 47 | 1150 | 20 | 6 | 0.10 | 0.40 | 21.4 | 61 | 10.8 | Example |
| 48 | 1150 | 20 | 6 | 0.10 | 0.40 | 21.6 | 63 | 10.6 | Example |
| 49 | 1150 | 20 | 6 | 0.10 | 0.40 | 21.6 | 64 | 10.7 | Example |
| 50 | 1150 | 20 | 6 | 0.10 | 0.40 | 21.9 | 68 | 12.6 | Example |
| 51 | 1150 | 20 | 6 | 0.10 | 0.40 | 22.3 | 65 | 10.8 | Example |
| 52 | 1150 | 20 | 6 | 0.10 | 0.40 | 21.7 | 67 | 12.5 | Example |
| 53 | 1150 | 20 | 6 | 0.10 | 0.40 | 22.1 | 65 | 10.7 | Example |
| 54 | 1150 | 20 | 6 | 0.30 | 0.40 | 11.3 | 74 | 15.3 | Example |
| 55 | 1150 | 20 | 6 | 0.20 | 0.40 | 12.2 | 70 | 13.2 | Example |
| 56 | 1150 | 20 | 6 | 0.10 | 0.40 | 12.1 | 68 | 10.4 | Example |
| 57 | 1150 | 20 | 6 | 0.05 | 0.40 | 11.7 | 65 | 9.3 | Example |

*The balance is composed of Fe and inevitable impurity.

REFERENCE SIGNS LIST

1 non-oriented electrical steel sheet
10 inner layer
20 surface layer

The invention claimed is:

1. A non-oriented electrical steel sheet having an inner layer defined as a region where a Si content is less than an average Si content in a total sheet thickness t, and surface layers defined as regions where a Si content is greater than or equal to the average Si content in the total sheet thickness t, the surface layers being provided on both sides of the inner layer, the non-oriented electrical steel sheet comprising a chemical composition containing:
  Si; and,
  C: 0.020 mass % or less,
  Mn: 0.010 mass % to 2.0 mass %, and
  S: 0.0100 mass % or less, as average contents in the total sheet thickness t, with the balance being Fe and inevitable impurities, wherein each of the surface layers has an average Si content $[Si]_1$ of 2.5 mass % to 7.0 mass %, the inner layer has an average Si content $[Si]_0$ of 2.1 mass % to 5.0 mass %, each of the surface layers has an in-plane tensile stress of 5 MPa to 48.6 MPa, the total sheet thickness t of the non-oriented electrical steel sheet has a sheet thickness t of is 0.01 mm to 0.35 mm, the surface layers have a total thickness $t_1$ with a ratio tilt of the total thickness $t_1$ to the total sheet thickness t being 0.10 to 0.70, the non-oriented electrical steel sheet has an average N content [N] in the total sheet thickness t of 40 ppm or less, and an iron loss $W_{10/400}$ in W/kg at a maximum magnetic flux density of 1.0 T and a frequency of 400 Hz and the total sheet thickness t in mm satisfy the following formula (1):

$$W_{10/400} \leq 8 + 30t \quad (1).$$

2. The non-oriented electrical steel sheet according to claim 1, wherein the chemical composition further contains, as average contents in the total sheet thickness t, at least one selected from the group consisting of Al: 0.10 mass % or less,
P: 0.10 mass % or less,
Sn: 0.10 mass % or less, and
Sb: 0.10 mass % or less.

3. The non-oriented electrical steel sheet according to claim 1, further comprising a texture where a ratio {100}/{111} of an integration degree of {100} plane to an integration degree of {111} plane is 55% to 90% in a cross section with $\Phi_2 = 45°$ of an orientation distribution function at a depth of ¼ of the total sheet thickness t from a surface of the non-oriented electrical steel sheet.

4. The non-oriented electrical steel sheet according to claim 1, wherein the chemical composition further satisfies the following formula (2):

$$[Mn][S] \leq 0.0030 \quad (2),$$

where [Mn] and [S] are average contents in mass % of Mn and S in the total sheet thickness t, respectively.

5. A method of producing the non-oriented electrical steel sheet according to claim 1, the method comprising:
subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
subjecting the steel sheet after the siliconizing treatment to a diffusion treatment in an $N_2$ atmosphere at a temperature of 950° C. or more and 1300° C. or less; and
cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

6. The non-oriented electrical steel sheet according to claim 2, further comprising a texture where a ratio {100}/{111} of an integration degree of {100} plane to an integration degree of {111} plane is 55% to 90% in a cross section with $\Phi_2 = 45°$ of an orientation distribution function at a depth of ¼ of the total sheet thickness t from a surface of the non-oriented electrical steel sheet.

7. The non-oriented electrical steel sheet according to claim 2, wherein the chemical composition further satisfies the following formula (2):

$$[Mn][S] \leq 0.0030 \quad (2),$$

where [Mn] and [S] are average contents in mass % of Mn and S in the total sheet thickness t, respectively.

8. The non-oriented electrical steel sheet according to claim 3, wherein the chemical composition further satisfies the following formula (2):

$$[Mn][S] \leq 0.0030 \quad (2),$$

where [Mn] and [S] are average contents in mass % of Mn and S in the total sheet thickness t, respectively.

9. The non-oriented electrical steel sheet according to claim 6, wherein the chemical composition further satisfies the following formula (2):

$$[Mn][S] \leq 0.0030 \quad (2),$$

where [Mn] and [S] are average contents in mass % of Mn and S in the total sheet thickness t, respectively.

10. A method of producing the non-oriented electrical steel sheet according to claim 2, the method comprising:
subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
subjecting the steel sheet after the siliconizing treatment to a diffusion treatment in an $N_2$ atmosphere at a temperature of 950° C. or more and 1300° C. or less; and
cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

11. A method of producing the non-oriented electrical steel sheet according to claim 3, the method comprising:
subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
subjecting the steel sheet after the siliconizing treatment to a diffusion treatment in an $N_2$ atmosphere at a temperature of 950° C. or more and 1300° C. or less; and
cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

12. A method of producing the non-oriented electrical steel sheet according to claim 4, the method comprising:
subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
subjecting the steel sheet after the siliconizing treatment to a diffusion treatment in an $N_2$ atmosphere at a temperature of 950° C. or more and 1300° C. or less; and
cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

13. A method of producing the non-oriented electrical steel sheet according to claim 6, the method comprising:
   subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
   subjecting the steel sheet after the siliconizing treatment to a diffusion treatment in an $N_2$ atmosphere at a temperature of 950° C. or more and 1300° C. or less; and
   cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

14. A method of producing the non-oriented electrical steel sheet according to claim 7, the method comprising:
   subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
   subjecting the steel sheet after the siliconizing treatment to a diffusion treatment in an $N_2$ atmosphere at a temperature of 950° C. or more and 1300° C. or less; and
   cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

15. A method of producing the non-oriented electrical steel sheet according to claim 8, the method comprising:
   subjecting a steel sheet with a Si content of 1.5 mass % to 5.0 mass % to a siliconizing treatment in a $SiCl_4$ atmosphere at a siliconizing treatment temperature of 1000° C. or more and 1300° C. or less;
   subjecting the steel sheet after the siliconizing treatment to a diffusion treatment in an $N_2$ atmosphere at a temperature of 950° C. or more and 1300° C. or less; and
   cooling the steel sheet after the diffusion treatment under a set of conditions including an average cooling rate $v_1$ of 5° C./s to 20° C./s in a temperature range from the diffusion treatment temperature to 900° C. and an average cooling rate $v_2$ of 30° C./s to 100° C./s in a temperature range from 900° C. to 100° C.

\* \* \* \* \*